United States Patent
Pardun

[15] 3,652,397
[45] Mar. 28, 1972

[54] PREPARATION OF PHOSPHATIDES
[72] Inventor: Hermann Pardun, Cleves, Germany
[73] Assignee: Lever Brothers Company, New York, N.Y.
[22] Filed: Jan. 8, 1970
[21] Appl. No.: 1,559

[30] Foreign Application Priority Data
Jan. 9, 1969  Germany..................P 19 00 959.7

[52] U.S. Cl....................195/30, 99/15, 99/123, 260/403
[51] Int. Cl. .........................................C12b 1/00
[58] Field of Search................195/2, 3, 12, 30; 99/15, 17, 99/50, 60, 90; 206/403; 252/1

[56] References Cited

UNITED STATES PATENTS 3,576,831  3/1971  Davis........................260/403

3,047,597  7/1962  Pardun.......................99/15 UX

OTHER PUBLICATIONS

Unilever, N. V.; Chem. Abs., Vol. 70, No. 79434W, 1969.
Wittcoff, H.; The Phosphatides, p. 99–115, 1951.
Oliefabrik, A.; Chem. Abs., Vol. 63, No. 13590 A, 1963.
Unilever, N. V.; Chem. Abs., Vol. 70, No. 114,012f, 1969.

*Primary Examiner*—A. Louis Monacell
*Assistant Examiner*—Gary M. Nath
*Attorney*—Louis F. Kline, Jr., Melvin H. Kurtz and Edgar E. Ruff

[57] ABSTRACT

Modified phosphatides of improved emulsifying power and suitable for use as anti-spattering agents in margarine are obtained by the partial hydrolysis of a vegetable phosphatide with an enzyme preparation containing lipase and phospholipase A until at least 2 percent and less than 15 percent of lysophosphatides are formed, and removal of free fatty acids by solvent extraction.

6 Claims, No Drawings

PREPARATION OF PHOSPHATIDES

This invention relates to processes for the preparation of partially hydrolyzed vegetable phosphatides.

Crude hydrated vegetable phosphatides (or plant lecithins) are obtained as by-products in the solvent-extraction of oilseeds for edible oil production. In typical commercial process (as more fully described in British Pat. No. 1,118,373) they are precipitated as slimes by the introduction of moist steam into the solvent-free crude vegetable oil, and then separated from the bulk of the oil by centrifugation and dried by evaporation under reduced pressure. The dried crude phosphatides consist of a mixture of about 65 percent by weight of materials insoluble in acetone, namely choline, ethanolamine, serine and inositol phosphatides, sugars and glycolopids, and about 35 percent of acetone-soluble substances, mainly neutral oil, free fatty acids and unsaponifiable constituents.

Such vegetable phosphatides are used as emulsifying agents for water-in-oil emulsions, for example margarine, and also for oil-in-water emulsions, for example mayonnaise and salad oils, but the choline phosphatide components on the one hand and the ethanolamine and serine phosphatide components (together known as cephalin) on the other, antagonise or depress the emulsifying power of each other.

Danish Pat. No. 101,649 describes the improvement of the emulsifying power of crude vegetable phosphatides by treating aqueous oil-containing vegetable phosphatide emulsions with lipase at from 50° to 80° C. for several hours. The lipase effects a partial hydrolysis of the fatty acid triglyceride of the oil to a mixture of mono- and di- glycerides, giving a product of improved emulsifying power, but an undesirable increase in free fatty acid content occurs, as a result of which the taste of the products thus prepared is less pleasant than that of normal vegetable phosphatides. Phosphatides can be converted into lysophosphatides by hydrolysis with the enzyme phospholipase A (lecithinase A) occurring together with lipase in pancreas extract or pancreatin, or by pancreatin which has been partially heat-inactivated to give a preparation having only phospholipase A activity.

It has now been found that a modified phosphatide emulsifying agent of neutral taste and light color and suitable for oil-in-water and water-in-oil emulsions can be prepared by the partial hydrolysis of an unhydrolysed vegetable phosphatide with an enzyme preparation containing both lipase and phospholipase A at from 30° to 70° C. until there has been formed at least 2 percent and less than 15 percent of lysophosphatides (monoacyl glycerophosphatides) by weight of the total phosphatides and lysophosphatides present, followed by separation of these by solvent extraction from free fatty acids present.

Suitable unhydrolysed vegetable phosphatides for use in the process are the crude hydrated vegetable phosphatides referred to above, for instance hydrated soyabean, groundnut, sunflower, corn and rapeseed oil phosphatides. Such starting materials can be the crude phosphatide slimes which have been separated from the bulk of the oil, for instance by centrifugation, and such a slime that has been subsequently dried, and such a slime which with or without subsequent drying has been subjected to further purification by extraction of the fatty acid triglyceride oil it contains by fat solvents, for example acetone. There can also be used phosphatide fractions obtained by solvent fractionation of the crude hydrated vegetable phosphatides, for example alcohol-soluble and alcohol-insoluble fractions, especially alcohol-soluble fractions with a proportion of phosphatidylcholine to phosphatidylethanolamine of at least 4 to 1 by weight, such as are described in British Pat. No. 1,113,241.

Suitable enzyme preparations containing lipase and phospholipase A are technical enzyme preparations of plant or animal origin, particularly technical extracts from pancreas, such as pancreatin. The enzyme preparations can be conveniently used in amounts of from 0.05 to 0.2 percent, preferably 0.05 to 0.1 percent, based on the weight of phosphatide employed.

The partial hydrolysis is conveniently carried out in the presence of at least 25 percent, and preferably at least 50 percent of water, by weight of the phosphatide to be hydrolyzed, and preferably at from 40° to 50° C.

The rate of hydrolysis increases with the amount of enzyme preparation employed, so that the reaction time required for a particular degree of hydrolysis is reduced. Typical reaction times are from 3 to 60 hours. Preferably hydrolysis is carried out until a lysophosphatide content of from 4 to 12 percent is reached.

The crude partially hydrolysed vegetable phosphatide (or hydrolysate) obtained is then subjected to extraction with a solvent suitable for separation of free fatty acids from the phosphatides and lysophosphatides present. The hydrolysate can be dried before extraction, but preferably the direct product of hydrolysis (containing the water present during hydrolysis) is used for the extraction.

Preferably the hydrolysate is dispersed in an organic solvent medium in which the free fatty acids are soluble and the phosphatides and lysophosphatides are insoluble, and a partially hydrolyzed phosphatide is then recovered from the insoluble residue.

The hydrolysate can be dried and dispersed in a first organic solvent in which the free fatty acids, phosphatides and lysophosphatides dissolve, a second organic solvent in which the free fatty acids are soluble but the phosphatides and lysophosphatides are insoluble then added to the solution until a phase containing the latter is precipitated, and the precipitated phase separated and purified partially hydrolysed phosphatide recovered from it. For the first solvent are suitable aliphatic, cycloaliphatic and aromatic hydrocarbons of from five to seven carbon atoms, for example pentane, hexane, heptane, cyclohexane, methylcyclohexane, and benzene, and chlorinated hydrocarbons of one or two carbon atoms, for example dichloromethane, dichloroethane, trichloroethylene and carbon tetrachloride. There can for example be used from 0.1 to 1.5 liters of hexane per kg. hydrolysate calculated as free of water. For the second solvent are suitable ketones or alkyl esters of carboxylic acids containing from two to four carbon atoms, for example acetone, methyl acetate and ethyl formate. There can for example be used from 1.5 to 3 liters of acetone per kg. dried hydrolysate. The extraction and precipitation can be repeated. The product after addition of both solvents forms two liquid phases, of which one phase contains oil, fatty acids and other undesired materials, and the other phase contains the phosphatides and lysophosphatides. After separation of the phases, the phase containing the phosphatides and lysophosphatides is freed from solvent, for example by evaporation under reduced pressure.

Preferably the hydrolysate is dispersed in an alcohol or ketone of from one to three carbon atoms, for example methyl, ethyl, propyl or isopropyl alcohol or acetone, and water is present: aqueous solvents consisting of 2 parts by volume of alcohol or ketone to from 1 to 3 parts of water can be used. The partially hydrolysed phosphatide is preferably first thoroughly stirred with a little alcohol or ketone, and the aqueous alcohol or ketone then added until at least two layers are formed. Usually three are formed of which the uppermost consists of dark-colored neutral oil and fatty acids, the middle one consists of a solution of bitter substances and sugars in aqueous solvent and the lowermost consists essentially of phosphatides, lysophosphatides and solvent. For the separation of these layers a centrifuge is convenient. Aqueous acetone containing from 5 to 30 percent of water can also be used, in which case two layers may be formed of which the upper layer contains the oil and the fatty acids and the lower layer contains the phosphatides and lysophosphatides. Where the hydrolysate already contains a sufficient amount of water, the alcohols or ketones can be added free of water.

Where sufficient water is present a chlorinated hydrocarbon solvent such as one of those mentioned above can be used as the sole solvent; the proportions of solvent and water should be such that the free fatty acids are in one phase and the phosphatides and lysophosphatides in the other.

After the phase containing the phosphatides and lysophosphatides has been separated, it is freed from solvent, for example by evaporation under reduced pressure. As the purified partially hydrolyzed vegetable phosphatide is liable to deteriorate in air by oxidation, carrier substances, for example neutral fatty acid triglyceride oils, mixtures of fatty acid mono- and di- glycerides, glycerol, sorbitol, propane-1,3-diol, and ethyl lactate, can be added before the final evaporation process to avoid this.

The products are emulsifying agents which can be used in the preparation of foodstuffs, for example margarine, mayonnaise and salad oils, feedingstuffs, for example synthetic calf milk, cosmetic preparations, for example lotions and salves, and pharmaceutical preparations.

The invention is illustrated by the following Examples, in which temperatures are in °C.

EXAMPLE 1

A crude hydrated soyabean phosphatide slime (1,000 g.) was stirred with water (100 g.) until an emulsion was formed, technical pancreatin (1 g.) added and the emulsion heated for 16 hours at 50°. After removal of water by evaporation under reduced pressure there was obtained a crude partially hydrolyzed phosphatide (1,000 g.) of acid number 33 and iodine color 40, containing 64 percent acetone-insolubles, 15.6 percent choline phosphatide, 8.5 percent cephalin and 3.0 percent lysophosphatide by weight: the amount of lysophosphatide present thus corresponded to about 4½ percent by weight of the total phosphatides and lysophosphatides. Half of this product was dissolved in hexane (500 ml.) and extracted with acetone (1,100 ml., containing 2.5 percent water by weight). The upper layer formed on standing was separated off and the lower layer extracted twice with hexane (550 ml.) and acetone (1,100 ml.). To the residue of purified partially hydrolyzed phosphatide was added a refined soyabean oil in equal amount to the oil removed in the extraction, and solvent was removed by evaporation under reduced pressure. The purified hydrolysate had an acid number of 19.7 and an iodine color of 25.

For determination of the emulsifying power of the product, water (50 ml.) at 50° was placed in a 100 ml. mixing cylinder, a solution of the purified hydrolysate (1 g.) in groundnut oil (9 g.) of melting point 32° was added and a coarse emulsion prepared by rotation of the cylinder through 180° 20 times. The cylinder was then placed in a waterbath maintained at 50° and the time in hours required for separation of 25 ml. water (half-value time) was noted. The test was carried out both with distilled water and water of 13° hardness, and a comparison was made with the crude partially hydrolysed phosphatide that had not been subjected to the extraction process.

|  | Half-value time (hr.) | |
|---|---|---|
|  | Distilled water | Water of 13° hardness |
| Crude hydrolysate | 2.8 | 3.0 |
| Purified hydrolysate | 4.25 | 4.0 |

EXAMPLES 2 TO 4

A crude hydrated syoabean phosphatide slime (2,000 g.) containing 56.6 percent by weight of dry substance was mixed with technical pancreatin (500 mg.) and allowed to stand for 51 hours at 60°. The acid number of the mixture on a dry weight basis increased during this time from 20 to 38. The crude hydrolysate thus obtained contained 50 percent by weight of water.

A portion (400 g.) of the crude hydrolysate was freed from water at 70° by evaporation in a rotary evaporator under reduced pressure to give a dried crude hydrolysate (201 g).

Another portion (400 g.) of this crude hydrolysate was stirred with acetone (1,000 ml.) at ambient temperature. After long standing the turbid upper layer was poured off from the layer of sediment and the latter then extracted again with acetone (1,000 ml). On evaporation of the reduced extract under reduced pressure there was obtained a dark, fatty acid-rich oil (70 g). The residue after addition of refined soyabean oil (70g.) was evaporated under reduced pressure to give a purified hydrolysate (200 g.) (Example 2).

A further portion (400 g.) of the crude hydrolysate was stirred with isopropyl alcohol (200 ml.) for 15 minutes at ambient temperature, and formed three layers on standing. The mixture was then centrifuged to separate the upper and middle layers from the lower layer. On evaporation of the combined upper and middle layers there was obtained an oil (44 g). Refined soyabean oil (44 g) was added to the lower layer and the mixture evaporated under reduced pressure to give a purified hydrolysate (201 g.) (Example 3).

A final portion (400 g.) of the crude hydrolysate was stirred intensively at 20° for 30 minutes with 1,2-dichloroethane (1,200 ml.). On standing there was deposited a lower layer containing phosphatide, from which the oil-containing dichloroethane layer was separated first by decantation and then by centrifugation, and on evaporation under reduced pressure there was obtained oil (71 g). To the residual phosphatide was added refined soyabean oil (71 g.) and the mixture evaporated under reduced pressure to give a purified hydrolysate (201 g.) (Example 4).

The dried crude and purified hydrolysates were subjected to analysis, to testing for taste threshold value, namely the lowest concentration of the produce in groundnut oil that could still be detected by half the members of a tasting panel, and to testing for anit-spattering action in margarine. For the latter purpose margarines were prepared containing 80 percent fat, 4 percent milk, 0.2 percent starch, and 0.2 percent salt by weight, and incorporating a series of amounts of the hydrolysates. The margarines thus obtained were heated by the methods described in Fette, Seifen, Anstrichmittel, 1963, 65, 29, and the formation of spatter determined on the visually assessed basis of

| 8 | very good | 4 | unsatisfactory |
| 7 | good | 3 | bad |
| 6 | satisfactory | 2 | very bad |
| 5 | adequate | 1 | unusable |

The results were as follows:

| Analytical data | Crude hydrolysate | Purified hydrolysate according to Example | | |
|---|---|---|---|---|
|  |  | 2 | 3 | 4 |
| Iodine color 1:10 | 32 | 18 | 2 8 | 20 |
| Acid number | 38 | 20 | 3 5 | 26 |
| % Choline phosphatide | 13.8 | 13.5 | 1 3.7 | 13.5 |
| % Cephalin | 8.0 | 7.8 | 7.6 | 7.4 |
| % Lysophosphatide | 5.0 | 4.9 | 4.8 | 5.0 |
| Taste Threshold Value % | 0.5 | 1.0 | 1.0 | 1.0 |
| Spatter Formation At concentration in g./kg. fat |  |  |  |  |
| 0.25 | 1 | 1 | 1 | 2 |
| 0.5 | 1 | 2 | 2 | 4 |
| 1.0 | 1 | 3 | 5 | 6 |
| 2.0 | 3 | 5 | 6 | 8 |
| 4.0 | 5 | 5 | 7 | 8 |

The amount of lysophosphatide (5.0 percent) present in the dried crude hydrolysate corresponds to about 7½ percent by weight of the total phosphatides and lysophosphatides.

What is claimed is:

1. A process for the preparation of a modified phosphatide emulsifying agent which comprises partially hydrolysing an unhydrolysed vegetable phosphatide with an enzyme preparation containing both lipase and phospholipase A at from 30° to 70° C. until at least 2 percent and less than 15 percent of lysophosphatides by weight of the total phosphatides and lysophosphatides present is formed, and then separating by solvent extraction the phosphatides and lysophosphatides from free fatty acids present.

2. A process according to claim 1, in which the unhydrolysed vegetable phosphatide is a crude hydrated vegetable phosphatide slime.

3. A process according to claim 1, comprising dispersing the hydrolysate in an organic solvent medium in which the free fatty acids are soluble and the phosphatides and lysophosphatides are insoluble, and recovering a partially hydrolysed phosphatide from the insoluble residue.

4. A process according to claim 3, comprising dispersing the dried hydrolysate in a first organic solvent in which the free fatty acids, phosphatides and lysophosphatides dissolve, adding to the solution a second organic solvent in which the free fatty acids are soluble but the phosphatides and lysophosphatides are insoluble until a phase containing the latter is precipitated, and separating the precipitated phase and recovering from it a purified partially hydrolysed phosphatide.

5. A process according to claim 3, comprising extracting the direct product of hydrolysis.

6. A process according to claim 5, in which the organic solvent medium is an alcohol or ketone of from one to three carbon atoms.

* * * * *